W. E. PAINE.
MEANS FOR BRAKING TRACTION VEHICLES.
APPLICATION FILED MAR. 14, 1912.
1,037,167.
Patented Aug. 27, 1912.
2 SHEETS—SHEET 1.
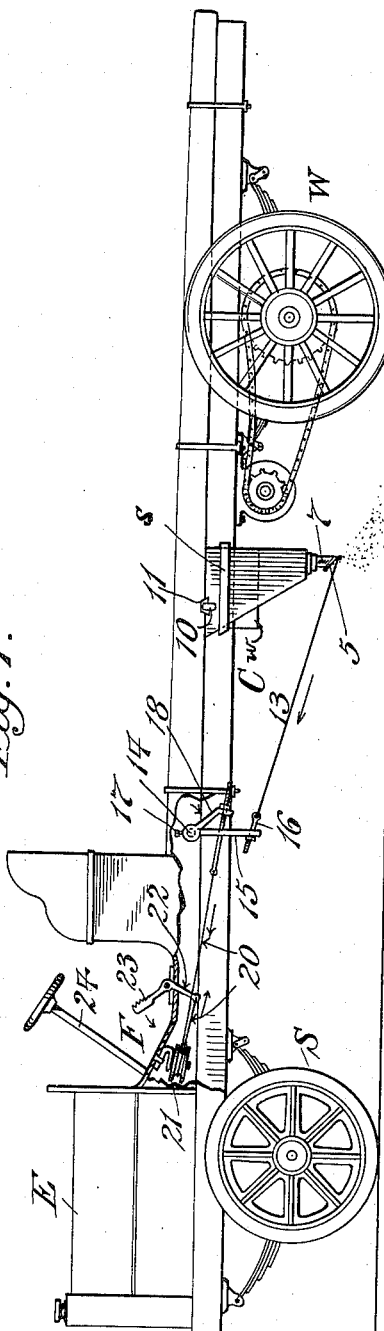
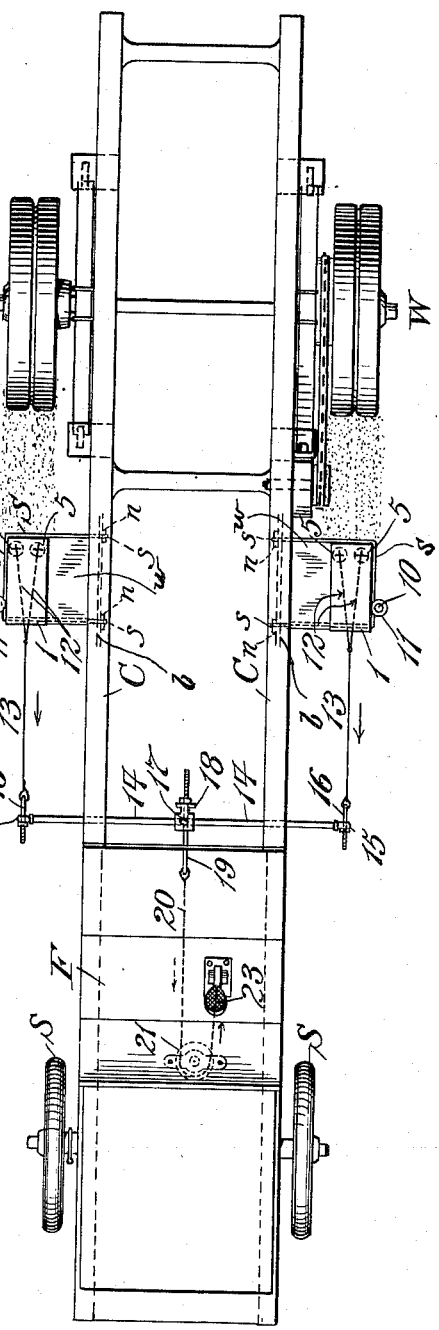
Witnesses
Edward G. Rowland
M. F. Keating
Inventor
William E. Paine
By Attorney
Charles J. Kintner

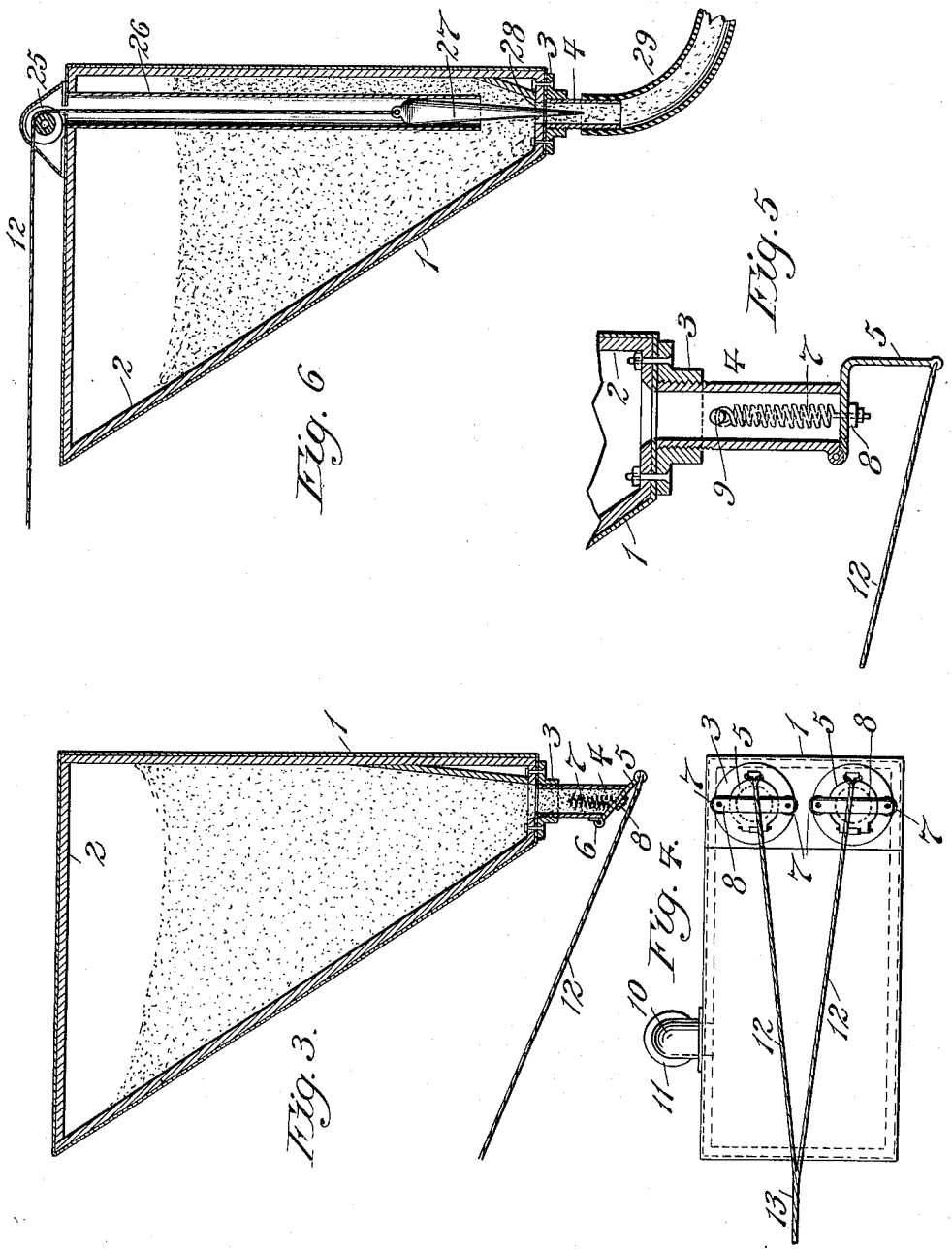

UNITED STATES PATENT OFFICE.

WILLIAM E. PAINE, OF NEW YORK, N. Y.

MEANS FOR BRAKING TRACTION-VEHICLES.

1,037,167.  Specification of Letters Patent.  Patented Aug. 27, 1912.

Application filed March 14, 1912. Serial No. 683,885.

*To all whom it may concern:*

Be it known that I, WILLIAM E. PAINE, a citizen of the United States, and resident of New York, borough of Manhattan, county and State of New York, have made a new and useful Invention in Means for Braking Traction-Vehicles, of which the following is a specification.

My invention is directed particularly to means for braking traction vehicles of the self-propelled type, such as auto cars generally, no matter what the source of power may be which propels them, and it has for its objects. First, to prevent the skidding of the wheels on slippery surfaces, such as asphalt streets and the like; or to prevent skidding when ascending and descending hills of relatively heavy grades under the conditions which often prevail in the use of such vehicles. Second, to effect a great saving in the wear of the tires of such vehicles where they are made of flexible or elastic material, such as rubber and the like. Third, to produce the effect above referred to in connection with two or more wheels of the vehicle so as to thereby minimize as far as possible the great strains put upon them in heavily loaded trucks or like vehicles. Fourth, to enable the chauffeur of such vehicles to produce the braking effect at all times with a minimum exertion, thereby making it possible to minimize his labor. Fifth, to provide means for effecting the braking of vehicles upon roadways which will greatly diminish the wear and tear of the roads and hence add to their efficiency. Sixth, to accomplish all of the results hereinafter referred to in connection with traction vehicles which run upon ordinary roadways or streets, whether such vehicles be wheeled vehicles, sledges, sleighs, or the like.

I have discovered that the best braking effects are produced on vehicles of the type referred to by distributing, in front of the traction wheels or in front of those portions which carry the load and move over the roadway, dry sand or equivalent substances in such quantities as will produce the necessary result, and to this end I have devised mechanism which I will now describe.

I have found that absolutely dry sand gives the best results and for the purpose of keeping the sand thus dry I preferably construct the sand containing vessels of sheet metal and line them throughout with a light absorbent wood, thus also affording a sand-containing vessel capable of great endurance and one which will not be readily worn. By thus providing a sand containing vessel of absorbent qualities I am enabled to maintain the sand dry at all times and avoid any danger of choking at the feeding valve where the same is fed out in a thin flat stream. I have ascertained that on asphalt and other slippery streets a minimum amount of sand may be applied with my improved sanding device and to the best possible effect.

The invention will be understood by referring to the accompanying drawings, in which, Figure 1 is a side elevational view of a motor vehicle of the traction type having my invention attached thereto; and, Fig. 2 is a plan view of Fig. 1, as seen looking from the top toward the bottom of the drawings, certain of the operative parts of the invention being shown in dotted lines. Fig. 3 is an enlarged detail sectional view illustrating the containing vessel and the operative parts for releasing the braking substance. Fig. 4 is a plan view of Fig. 3 as seen looking thereat from the bottom toward the top of the drawings. Fig. 5 is a detail view of a modified form of the apparatus seen in Fig. 3. Fig. 6 is a sectional view similar to Fig. 3 of a modified form of the invention which discloses a different method for releasing the braking substance.

Referring now to the drawings in detail and first to Figs. 1 and 2, C, C represents a chassis of a motor vehicle of the truck type having front steering wheels S and rear traction wheels W provided with the usual rubber or equivalent flexible tires. E represents the motor or engine, in this instance preferably of the explosive type, and F the floor in the rear of the motor in front of the seat of the chauffeur. On each side of the chassis and directly in front of the rear or traction wheels W, I attach two water tight containing vessels 1 made preferably of sheet iron and lined with wood 2 for the purpose of making them strong, light, and durable; the wood being absorbent and also preventing the wearing effect of the sand and the metal giving the necessary strength and preventing water from moistening the sand. These vessels are preferably semi-pyramidal in shape, as shown in Figs. 3 and 6, and are secured to the sides of the chassis with the smaller ends turned down, as shown in Fig. 1. The means for securing them to the chassis embraces a wooden block $w$ on either side of sufficient width to locate the sand containing vessels directly in front of the wheels W, and also relatively broad stirrups $s$ which are secured to the chassis through bolt holes in the webs $b$ thereof. $n, n, n, n$, are nuts for securing the stirrups in place and quickly detaching the sand containing vessels. By making the wooden blocks of different thickness the sand vessels may be applied to different auto cars dependent upon the width of the axles, as will be readily understood. To the bottoms of the sand containing vessels are secured, in each instance by bolts and collars 3, 3, two outlets or tubes 4, 4. 5, 5 are discharge valves pivotally secured to the lower ends of these tubes by hinges 6, 6. These discharge valves 5, 5 are held upward by strong spiral springs 7, 7, and a cross bar 8 attached thereto at their lower ends and at the upper ends by pins 9, 9, secured to the upper end of the tubes 4, 4. 10, 10 (see Figs. 1, 2 and 4) are filling pipes in the top of the vessels and 11, 11 are covers which prevent any possibility of the moisture entering the same. 12, 12 are pairs of chains, cords or rods secured directly to the free ends of the discharge valves 5, 5 and adapted to be actuated against the action of the springs 7, 7, by single chains or rods 13, the free ends of which are attached to adjustable eye-bolts 16, 16 which in turn are attached to the lower ends of bell crank levers 15, 15. These crank levers are carried at the opposite ends of a cross shaft 14 journaled on the chassis of the machine. Near the middle of this shaft 14 is located an arm 18 which is held by an adjustable screw 17 and in the lower end of this arm is secured an eye-bolt 19 to which is attached an operating cord or chain 20 running forward to a pulley 21 and around the same and backward to the arm 22 of a bell crank lever which is journaled in the floor F of the car and has an operating lever or pedal 23 adapted to be actuated by the foot of the chauffeur. 24 represents the steering wheel and shaft.

The operation of the invention is as follows—The covers 11, which are usually provided with screw-thread attachments for connecting them to the inlet pipe, are removed and the vessels filled to their full capacity with fine dry sand or equivalent substance and the apparatus is ready for use. The sand is released from time to time as the necessities of the case demand, by the chauffeur placing his foot upon the pedal 23, thereby releasing through the discharge valves as much of the material as desired. As will be apparent on inspection of Figs. 1 and 2, the sand or other braking material is scattered in the direct line of the traction wheels in any desired amount to most effectually produce the braking effect desired. With traction vehicles of the automobile type, as now arranged this braking effect is usually accomplished by braking chains placed upon the tires at distances from each other generally equal to the distance between the spokes of the wheels. These chains, however, I have ascertained, do not effectually brake the vehicle at all times, or prevent it from skidding, because between each of the chains the braking effect is a minimum, practically allowing the wheel to slide on hills or smooth asphalt surfaces, as will be appreciated. Wheels which are provided with these chain brakes are also quickly ruined by reason of the terrific wear and tear, it being an actual fact that they frequently cut the tires up in a short time, particularly where heavy loads are transported. My invention prevents all of this and produces a minimum amount of wear on the surface of the wheels. Furthermore, by liberating the braking substance in front of the two wheels W, W I apply the braking effect with like results on both sides of the vehicle, thus producing a maximum effect at all times and with the result that the wheels are never liable to skid when the proper amount of sand is released. It is also obvious that with my improvement the surface of the roadway is benefited by adding sand or like substance thereto, whereas chains or like braking attachments applied thereto are very destructive of the road surface, so that my invention not only actually adds a beneficial effect to the road surface, but at the same time materially decreases the wear and tear upon the tires.

I prefer to use as a braking substance absolutely dry sand, although other substances may be used with the desired effect; as, for instance, ground or crushed cinders may be used with advantage—in fact where such a substance is used the material advantage of lightness is added.

In Fig. 5 of the drawings I have shown the valve 5 as of bell crank form and the outlet surface as parallel with the bottom of the sand containing vessel, thereby giving better leverage effect, and also decreasing the possibility of the outlet becoming clogged or stopped with mud or equivalent material. This valve may be, if preferred, of relatively larger surface than the surface of the opening, in order to prevent any possibility of water or dirt being thrown into the opening in the case of very muddy roads.

In Fig. 6 of the drawings I have shown a modified form of the feeding appliance for effecting the release or liberation of the sand or equivalent braking substance. In this form of the invention I provide a tube 26 which has an inlet at the tube and a pulley 25 covered by a housing, and in this tube I locate a weighted cone-shaped valve 27 of sufficient size to either close the entire opening 28 of the outlet or tube 4 or regulate the amount as may be desired, by the chain 12 which is connected to the chain or rod 13, as before, running forward to the point of appliance. In this form of the invention the cone-shaped valve 27 not only regulates the feed but assures the advancement of the sand or braking substance, as desired. I also attach to the lower end of the outlet or tube 4 a flexible tube 29 of rubber or equivalent material which has a backward turn toward the surface of the wheel and prevents any possibility of the choking up of the outlet during operation, due to water or ice. I may inclose the cords and chains 13 and 20 in protecting tubes so as to prevent mischievous boys from releasing the sand.

I am aware that it is old to effect the braking of wheeled vehicles which run upon rails by releasing sand and allowing the same to fall upon the head of one of the rails immediately in advance of the locomotive wheels, and I make no claim hereinafter broad enough to include such an apparatus.

I am also aware that it has heretofore been proposed to distribute sand in front of the wheels of automobiles for producing the effects which I have heretofore referred to and I make no claim herein broadly to the application of this principle.

I believe it is broadly new with me to provide an auto car with detachable sand containing braking devices adapted to carry variable supplies of sand or like substances for the purpose of avoiding skidding and for effecting braking when released, as the necessities of the case may demand, and my claims in this respect are generic. I prefer to make these sand boxes detachable because of the fact that oftentimes days and months may occur, as in the summer time, when they are not needed and I thereby avoid the carrying of them and do away with the useless expenditure of power.

Having thus described my invention what I claim and desire to secure by Letters Patent of the United States is—

1. Means for braking traction vehicles, embracing two independent water-tight sand containing vessels secured on opposite sides of the chassis of an automobile and directly in front of the traction wheels thereof, said sand containing vessels being provided each with one or more discharge valves operatively connected to a single bell-crank lever; in combination with a chain or cord for operating the same; together with a pulley located beneath the floor and carrying such chain or cord and a pedal connected to said chain, and all acting substantially as described.

2. Means for braking traction vehicles embracing two independent water-tight sand containing vessels detachably secured at their upper ends to the sides of the chassis thereof and located directly in front of the traction wheels, said containing vessels being provided each with one or more discharge valves operatively connected to the opposite ends of a rock shaft which in turn is connected by a single chain or cord to a pedal adapted to be operated by the chauffeur, substantially as described.

3. Means for braking traction vehicles embracing two independent water-tight sand containing vessels made of sheet metal and lined interiorly with soft porous wood; in combination with valves at their lower ends adapted to discharge the sand in thin, flat streams in front of the traction wheels; together with means connecting said valves directly with a rock-shaft which in turn is connected by a single chain or cord to a pedal adapted to be operated by the chauffeur, substantially as described.

4. In a traction vehicle a sand containing vessel made of sheet metal and lined interiorly with soft porous wood; in combination with means for quickly attaching it at its upper end to the chassis on either side of the vehicle; together with a plurality of valves located at the lower end of said vessel having means for releasing the sand in thin, flat or sheet like form, substantially as described.

5. Means for braking traction vehicles embracing a sand containing vessel having a discharge valve at its lower end; in combination with means surrounding said vessel for detachably securing it to the outer face of the chassis directly in front of a traction wheel, and means accessible to an attendant for opening the valve, substantially as described.

6. A traction vehicle provided with braking means consisting of two semi-pyramidal containing vessels, said vehicle being provided with laterally extending stirrups attached to the frame of the chassis for detachably securing the containing vessels directly in front of the traction wheels, the vessels having discharge valves provided with means accessible to an attendant for controlling the flow of the braking medium, substantially as described.

In testimony whereof I have signed my name to this specification in the presence of two subscribing witnesses.

WILLIAM E. PAINE.

Witnesses:
C. J. KINTUR,
M. F. KEATING.